United States Patent Office 3,847,854
Patented Nov. 12, 1974

3,847,854
PREFERENTIAL PLASTICIZATION OF IONOMETRIC COMPOUNDS
Nathan H. Canter, Edison, and Donald J. Buckley, Sr., Plainfield, N.J., assignors to Esso Research and Engineering Company
No Drawing. Continuation of abandoned application Ser. No. 103,902, Jan. 4, 1971. This application July 27, 1973, Ser. No. 383,350
Int. Cl. C08d 11/02
U.S. Cl. 260—23.7 M          14 Claims

ABSTRACT OF THE DISCLOSURE

Ionomers are readily processed at otherwise unworkable temperatures by addition thereto of preferential plasticizers. These plasticizers must be dispersible in the ionomer, have at least one functional consituent which exhibits a bond moment whose absolute value is at least 0.6 Debyes, and must be liquid at the desired processing temperature of the ionomer.

This is a continuation of application Ser. No. 103,902 filed Jan. 4, 1971, now abandoned.

BACKGROUND OF THE INVENTION

Hydrocarbon polymers generally fall into two broad classes, thermoplastic and thermosetting resins. Thermoplastic resins may be readily worked by heating the polymer up to its softening point or melting point. They may then be processed by such deformation methods as vacuum forming, extrusion of a melt, compression molding, etc.

The thermoset resins can generally not be reworked once they have hardened. In general, thermoset resins owe their unique properties to covalent crosslinks between polymer molecules. The crosslinks may be introduced by interaction of various monomers such as copolymerization of styrene in the presence of smaller amounts of divinyl benzene or the reaction of epoxy type resins with polyamines.

Uncured elastomers such as natural rubber and butyl rubber are thermoplastic. They may, however, be crosslinked or vulcanized by the use of sulfur and accelerators which react with the carbon of the unsaturated bonds in the polymer molecules to form in effect a thermoset product which can no longer be fabricated or worked except by machining or similar techniques. The vulcanized polymers have found wide utility because of the significant improvement in physical properties by crosslinking. Natural rubber, for example, may be crosslinked or vulcanized by the use of sulfur which reacts with the carbon of the unsaturated bonds in the polymer molecule to form a bridge between two molecules so that one polymer molecule is covalently bonded to the second molecule. If sufficient crosslinks of this type occur all molecules are joined in a single giant molecule. Once crosslinked, the polymer is intractable and can no longer be fabricated except possibly by machine. It has, however, significantly improved physical properties. Thus, by vulcanizing rubber, elasticity, tear resistance, flexibility, thermo-mechanical stability and many other properties are either introduced or improved.

A third class of polymers has recently been developed which, although they are crosslinked, have a softening range of temperatures and may even be dissolved in various solvents. At normal use temperatures, these polymers behave similarly to crosslinked polymers. At elevated temperatures, however, they may be deformed and worked in the same manner as thermoplastic resins. Such polymers are said to be physically crosslinked. An example of such materials are ionic hydrocarbon polymers (ionomers). These products owe their unique properties to the fact that crosslinking is accomplished by ionic rather than covalent bonding between molecules of the polymer.

These ionic polymers or ionomers may be readily prepared by a variety of techniques using numerous homo-, co-, and terpolymers as backbones. However, while all ionomers have several obvious advantages, one disadvantage to all is the increased difficulty in processibility as compared to similar polymers having the same backbone but without ionomeric crosslinkages.

THE PRESENT INVENTION

It has now been unexpectedly discovered that it is possible to plasticize ionomers preferentially, thus greatly enhancing the ease of processibility, while at the same time, retaining all known advantages of ionomers at normal use temperatures. This is accomplished by dispersing in the ionomer small amounts of preferential plasticizers, i.e., plasticizers which primarily relax ionic bonds.

Most ionomers have fairly high softening points, i.e., in the range of about 120° C. or higher. For certain ionomers the softening point is above the thermal chemical decomposition point of the material. Until now it has been necessary to heat ionomers at least to temperatures 20 to 30° above the softening point, e.g., in the range of 150° C., in order to get good processibility. By using the plasticizers of the instant invention it is possible to process ionomers at significantly lower temperatures than were previously feasible.

In order to be useful in the instant invention, these preferential plasticizers must be dispersible in the ionomer and be liquid during processing of the ionomer. They must also possess at least one functional consituent which exhibits a bond moment whose absolute value is at least 0.6 and preferably at least 0.7 Debyes. This requirement is necessary in order that there be sufficient polarity within the plasticizer molecule to attack the ionomeric crosslinkages. Typical examples of functional constituents which exhibit acceptable bond moments are listed in Table I below. This table is, of course, not meant to be exhaustive, and any functional constituents not shown below which nonetheless have bond moments of at least 0.6 Debyes are also useful.

TABLE I

| Unit | Bond moment* (Debyes) (Absolute Value) |
|---|---|
| C=O [1] | 2.4 |
| C—O [1] | 0.86 |
| O—H [1] | 1.53 |
| N—H [1] | 1.31 |
| C—Cl [1] | 1.56 |
| C—F [1] | 1.51 |
| C—S [2] | 1.0 |
| C=S [2] | 2.7 |
| C—Br [1] | 1.48 |
| SH [1] | 0.68 |
| NO [3] | 4.4 |
| C≡N [1] | 3.6 |
| S→O [4] | ~2.9 |
| P—Cl [1] | 0.81 |
| S—Cl [2] | 0.8 |
| Cl—O [1] | 0.7 |
| P—O [4] | 2.8 |
| P—S [4] | 3.2 |
| B—O [4] | 3.7 |
| S—B [4] | 3.9 |

[1] C. P. Smythe, *J. Phys. Chem.*, 41, 209 (1937).
[2] C. P. Smythe, *J. Am. Chem. Soc.*, 60, 183 (1938).
[3] E. P. Linton, *J. Am. Chem. Soc.*, 62, 1945 (1940).
[4] G. M. Phillips et al., *J. Chem. Soc.*, 146 (1945).
*C—H bond moment reference point is 0.3.

Within the above description of preferential plasticizers there are two useful types. These will be designated as volatile and non-volatile plasticizers. The major practical difference between the two is that the non-volatile plasticizers remain in the final product acting essentially as inert fillers at normal use temperatures. The volatile plasticizers, on the other hand, are evolved from the ionomer once they have performed their function.

In order to function as a non-volatile plasticizer, a material must have, in addition to the above-mentioned properties, a melt point or reversible decomposition point which is substantially above the contemplated use temperature of the ionomer and which is in the vicinity of a preselected processing temperature, i.e., at or below the preselected processing temperature. For practical purposes, the plasticizer's melt point should be no more than 100° C., preferably no more than 50° C., below the preselected processing temperature.

The temperature at which the ionomer will normally be used is, of course, dependent upon the function which it is designed to perform. However, in most cases, the specified and intended use temperature will generally not exceed 180° C. If use for the ionomer at ambient temperature is required, it is normally preferable that the non-volatile plasticizer have a melting point of at least 50° C. As a good general rule, one should pick a plasticizer whose melting point is at least 25° C. above the contemplated use temperature of the ionomer.

Since the non-volatile plasticizers will behave essentially as plasticizers only above their melting points, one should select a plasticizer whose melting point is at, or preferably below, a preselected processing temperature and, of course, significantly below the normal softening point of the ionomer in order that the plasticizer have practical advantages. This system allows an operator to select a processing temperature which is independent of the softening point of the ionomer and which allows the use of his processing equipment at maximum efficiency.

It should be understood that the melting point of a compound as used herein refers not only to the conventional definition of the term but includes compounds which possess a reversible decomposition point.

In order for these plasticizers to be useful, they must be readily dispersible in their solid state in the ionomer of interest. In order to enhance the dispersibility of the preferential plasticizer in the ionomer, it is often helpful if the plasticizer contains one or more hydrocarbon moieties. However, the plasticizer must not be so readily dispersible that it becomes completely molecularly soluble in the ionomer. If this were the case, the plasticizer would not retain an independent melt point, and would act as a plasticizer at all temperatures. Since the plasticizer's dispersibility will of course depend upon the ionomer in which it is used, it is not possible to specify the maximum amount of hydrocarbon which may be present in the plasticizer. However, it is generally preferable that the total carbon number of the plasticizer does not exceed $C_{80}$, and most preferably should not exceed $C_{60}$.

Because the non-volatile preferential plasticizers of the instant invention plasticize ionomers only when in a fluid state, they act essentially as fillers at the normal use temperature for the ionomer. At temperatures near or above the melting points of the plasticizers, the agents reduce the melt viscosity of the ionomer and allow it to be readily processed (or fabricated) at temperatures where the ionomer would be otherwise unworkable. When processing is desirably complete, the ionomer is allowed to cool sufficiently (e.g. to its range of use temperatures) to cause the non-volatile plasticizer to solidify.

This is particularly important for such applications as hot melt adhesives, injection molding, calendering, extruded goods, and inner tube fabrication. For these applications it is particularly desirable to retain high melt viscosity (green strength) at low temperatures for ionomers, such as sulfonated rubbers, while lowering the melt viscosity at high temperatures. Use of these preferential plasticizers also allows introduction of much higher percentages of highly polar ionomeric groups onto polymer backbones, while retaining fabricability in the systems, than had previously been feasible. Further, these preferential plasticizers, because of their polarity, act only to relax ionomeric bonds, i.e., attack only ionomeric cross-linkages, to the virtual exclusion of any substantial effects on the backbone chain. The non-volatile plasticizers, since they remain incorporated in the ionomer, also allow for reworking of scrap by reheating the ionomer above the melting point of the plasticizer.

Typical examples of non-volatile preferential plasticizers useful in the instant invention include polar materials containing oxygen, phosphorus or nitrogen atoms. Examples of materials containing oxygen atoms are mono- and polyfunctional organic acid salts such as calcium stearate, zinc laurate, zinc stearate, magnesium laurate, aluminum ricinoleate, stearic acid, lauric acid, benzyl alcohol, resorcinol, distearyl ketone, diglycol distearate, etc. Other oxygen-containing compounds useful as plasticizers in the instant invention are esters and ethers. Illustrative examples are dimethyl sebacate, dimethyl phthalate, polyethylene oxides, nonyl phenol, resorcinol, and nonyl phenoxide.

Materials containing phosphorus have been found, surprisingly, to be good preferential plasticizers also. Illustrative of such materials are triphenyl phosphate, tri(1,4-tolyl)phosphate, and tris(3,5-dimethyl phenyl)phosphate.

Materials containing nitrogen are also useful preferential plasticizers. Examples are diphenyl guanidine, diortho-tolyl guanidine, piperazine, diphenylamine, and phenyl-$\beta$-naphthylamine. Materials containing simultaneously oxygen, nitrogen, or phosphorus groupings are also useful agents.

Other useful non-volatile preferential plasticizers include materials which release a small polar molecule such as water at elevated temperatures. Hydrated salts are good examples of such materials. Therefore, materials such as $LiSO_3 \cdot 2H_2O$, $(NH_4)_2SO_4 \cdot Ce(SO_4)_3 \cdot 8H_2O$, $$(NH_4)Cr(SO_4)_2 \cdot 12H_2O,$$

$(NH_4)Fe(SO_4)_2 \cdot 12H_2O$, $BaO_2 \cdot 8H_2O$, $BiO_2 \cdot 2H_2O$, $FeF_2 \cdot 8H_2O$, etc., make ideal plasticizers. Alcoholated salts such as $CaCl_2 \cdot (CH_3OH)_4$ can also be used.

The second type of preferential plasticizer is the volatile plasticizer. This type of agent relaxes the ionic bonds in the system across the range of temperatures from the plasticizer's melt point to its actual boiling point and allows fabrication of the ionomer to take place across this same temperature range.

These volatile plasticizers should have a normal boiling point in the range of a preselected processing temperature. This range must of necessity depend on several factors, e.g., the pressure in the processing equipment (injection molder, calender, extruder, etc.); the amount of plasticizer employed; the processing temperature selected; the particular ionomer; etc. A good general rule, although subject to variations, is to select a plasticizer having a normal boiling point in the range of from not more than 50° C., and preferably not more than 30° C., below the pre-selected processing temperature to not more than 125° C., preferably not more than 75° C., above that temperature.

Because of the pressures created in most processing equipment, volatile plasticizers will remain in their liquid states at temperatures much in excess of their normal boiling points. However, upon leaving the equipment the pressure is typically reduced to general range of atmospheric and, provided that the temperature remains above the plasticizer's normal boiling point, the plasticizer will readily evolve. In any event, either further heating of the ionomer or diminution of pressure or both will result in evolution of the plasticizer and virtually complete formation of the ionomeric bonds.

Thus, it can be seen that, for practical purposes, it is most preferable to employ a volatile plasticizer having a boiling point which is at or slightly below (e.g., no more than 10° C. below) the preselected processing temperature. No additional treatment after processing would then be required to cause evolution of the agent.

The practical utility of this method is that it allows fabrication with vented processing such that the ionomer will be structurally stable to much higher use temperatures than it would in the presence of non-volatile preferential plasticizers having melt points at elevated temperatures. The volatile plasticizers must have a melt point of at least 40° C. and a boiling point with an approximate upper limit of about 270° C. Preferably the melt point is at least 10° C. and the boiling point is at most 200° C.; most preferably the boiling point will be in the range of 120 to 190° C. Volatile preferential plasticizers may be plasticizers for the polymer backbone chain as well as the ionic bonds. Since in practical utilization this type of material will evolve, it need not be as specific in its interaction tendencies as preferential plasticizers which are retained by the polymer.

Typical examples of volatile preferential plasticizers which are useful in the present invention include polar compounds containing oxygen, phosphorus, halogen, nitrogen, or sulfur atoms. Examples of those materials containing oxygen atoms are water and ethers such as tetrahydrofuran, p-dioxane, diethyl ether, dibutyl ether, butyl phenyl ether, and ethyl hexyl ether, and alcohols such as methyl alcohol, ethyl alcohol, isopropyl alcohol, and n-butyl alcohol. Examples of volatile plasticizers containing phosphorus include tributylphosphate, triisopropylphosphate, and triethylphosphate. Examples of materials containing halogen include chloroform, bromoform, 1,1,1-trichloroethane, and 1-chlorooctane. Examples of agents containing nitrogen are ethylamine, aniline, and dihexylamine. Examples of volatile plasticizers containing sulfur include 1-butanethiol.

There are no limits on the polymers useful in the instant invention as long as they contain ionomeric cross-linkages, i.e., are ionomers. These ionomeric polymers are normally prepared by attaching acid groups to the polymer and then neutralizing the acid moiety with metal ions to ionically link the polymers. The metal ions normally employed are alkali metal ions or amine ions. The acid group may be introduced into the polymer chain in a variety of ways. One way is by grafting acid groups on the predominant polymer, e.g., sulfonating polystyrene. Another way is by copolymerizing an $\alpha,\beta$-ethylenically unsaturated acid monomer with the predominant monomer, or by graft-polymerizing an $\alpha,\beta$-ethylenically unsaturated acid moiety on the predominant polymer.

Typical examples of ionomers employing salts of carboxylic acid type pendant groups are disclosed in British Patent 1,011,981; U.S. Pat. 3,264,272; U.S. 3,322,734; U.S. 3,338,734; U.S. 3,355,319; U.S. 3,522,222; U.S. 3,522,223; and in Kobunshi Kagaku (High Polymer Chemistry), 25, No. 274, pages 107–115 (1968). Typical examples of ionomers employing phosphonate-type pendant groups include those disclosed in U.S. 3,094,144; U.S. 2,764,563; Soviet Patent 211,079, U.S. 3,097,194, U.S. 3,255,130, and by J. P. Schroeder and W. P. Sopchak in *Journal of Polymer Science*, 47, 417–433 (1960). Typical examples of ionomers employing sulfonate-type pendant groups include those disclosed in U.S. 2,714,605; U.S. 3,072,618; and U.S. 3,205,285. Numerous of the above references are directed to more than one of these three general categories.

Further, it has recently been discovered that both plastic and elastomeric aromatic containing polymers (e.g., styrene-butadiene rubber) and non-aromatic polymers, in particular, olefinically unsaturated polymers such as butyl rubber and ethylene-propylene-diene terpolymers, commonly known as EPDM's, may be sulfonated to make physically cross-linked materials (see U.S. applications Ser. No. 806,052 now abandoned and Ser. No. 877,849 now U.S. Pat. 3,642,728, incorporated herein by reference).

Other polymers useful in the instant invention are disclosed in U.S. 3,417,036, which discloses preparation of polyethers containing pendant polar groups such as carboxyl, carboxylate, sulfoxide, and phosphorous ester groups.

From the above references it can be seen that the polymeric backbone has no practical restriction other than that it contain or be capable of receiving a highly polar pendant group, which group has the capacity to form ionomeric cross-linkages.

The plasticizers of this invention may be dispersed in the ionomer by any of the processes known in the art for dispersing conventional plasticizers or fillers. These methods include dry blending, milling, kneading, Banbury mixing, plasticating extrusion, etc. The plasticizer may be dispersed with filler (such as carbon black or mineral fillers) or oil and thereafter dry blended. Alternatively, the plasticizer may be dissolved in an appropriate solvent and then added to the ionomer, which may or may not be in solution, with subsequent removal (or evaporation) of the solvents. The method of choice is not critical but will depend to some extent on the ionomer and plasticizer to be chosen. The amount of volatile plasticizer used is generally in the range of about 0.25 to about 15 wt. percent of ionomer. Since, for the non-volatile plasticizers, plasticization of the polymer backbone is to be avoided as much as possible, no more than about 6–7 wt. percent should be employed. The lower limit for non-volatile plasticizers is 0.25 wt. percent. The preferable range for either type is from 0.5 to 4 wt. percent.

In order to illustrate the invention, the discussion will hereafter be directed to unsaturated, sulfonated elastomers as examples of typical ionomeric polymers. These elastomers normally have about 0.6 to 100 mole percent unsaturation and about 0.2 to about 3.0 mole percent sulfonation. Detailed techniques for the preparation of these unsaturated, sulfonated elastomers are set forth in co-pending applications S.N. 877,849 and S.N. 806,052. Generally, however, the elastomers are selectively sulfonated at sites of olefinic unsaturation by utilizing a sulfonating agent comprising a complex of a Lewis base such as triethylphosphate with a sulfur trioxide donor such as $SO_3$, chlorosulfonic acid, etc.

Particularly preferred unsaturated, sulfonated ionomers include the sulfonated derivatives of the following polymers: butyl rubber (including halogenated butyl rubber), EPDM, polybutadiene, polyisoprene (natural rubber), styrene-butadiene rubber (SBR), and polycholoroprene.

The expression "butyl rubber" as employed in the specification and claims is intended to include copolymers made from a polymerization reacted mixture having therein from 70 to 99.5% by weight of an isoolefin which has about 4 to 7 carbon atoms, e.g., isobutylene and about 0.5 to 30% by weight of a conjugated multiolefin having from about 4 to 14 carbon atoms, e.g., isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of butyl rubber is described in U.S. Pat. 2,356,128 which is incorporated herein by reference.

For the purposes of this invention, the butyl rubber may have incorporated therein from about 0.2 to 10% of combined multiolefin; preferably about 0.5 to about 6%; more preferably, about 1 to about 4%, e.g. 2%. Illustrative of such a butyl rubber is Enjay Butyl 268 (Enjay Chemical Co.), having a viscosity average molecular weight of about 450,000, a mole percent unsaturation of about 1.5% and a Mooney viscosity of about 55 to 260° F.

Halogenated butyl rubber is commercially available and may be prepared by halogenating butyl rubber in a solution containing between 1 to 60% by weight of butyl rubber in a substantially inert $C_5$–$C_8$ hydrocarbon solvent such as pentane, hexane, heptane, etc., and contacting this butyl rubber cement with a halogen gas for a period of about 25 minutes, whereby halogenated butyl rubber and a hydrogen halide are formed, the copolymer containing up to one halogen atom per double bond in the copolymer. The preparation of halogenated butyl rubber is old in the art, see, e.g., U.S. 3,099,644 which is incorporated herein by reference. This invention is not intended to be limited in any way by the manner in which butyl rubber is halogenated, and both chlorinated and brominated butyl rubber are suitable for use in this invention. Further, the rubber may be halogenated before or after sulfonation.

Illustrative of halogenated butyl rubbers is Enjay Butyl HT–10–66 (a chlorinated butyl rubber containing about 1.3 wt. percent chlorine, having about 1.7 mole percent unsaturation and a viscosity average molecular weight of about 357,000).

Low molecular weight butyl rubbers, i.e., butyl rubbers having a viscosity average molecular weight of about 5,000 to 85,000 and a mole percent unsaturation of about 1 to about 4% may be sulfonated and are also included in this invention. Preferably, these polymers have a viscosity average molecular weight of about 15,000 to about 60,000.

The term "EPDM" is used in the sense of its definition as found in ASTM–D1418–64 and is intended to mean a terpolymer containing ethylene and propylene in the backbone and a diene in the side chain. Illustrative methods for producing these terpolymers are found in U.S. Pat. 3,280,082, British Patent 1,030,289 and French Patent 1,386,600 which are incorporated herein by reference. The preferred polymers contain about 45 to about 90 wt. percent ethylene and about 2 to about 10 wt. percent of a diene monomer, the balance of the polymer being propylene. Preferably, the polymer contains about 50 to about 75 wt. percent ethylene, e.g., 56 wt. percent, and about 2.6 to about 4.0 wt. percent diene monomer, e.g., 3.3 wt. percent. The diene monomer is preferably a nonconjugated diene. The viscosity average molecular weight range is generally 40,000 to 800,000, preferably 80,000–450,000, and most preferably 150,000–300,000. Low molecular weight EPDM's, i.e., those having a viscosity average molecular weight of about 2,000 to 40,000 and a diene content of about 0.5 to 15% by weight are also capable of being sulfonated and are meant to be included in this invention.

Illustrative of the nonconjugated diene monomers which may be used in the terpolymer (EPDM) are hexadiene, dicyclopentadiene, ethylidene norbornene, methylene norbornene, propylidene norbornene, and methyl tetrahydroindene. A typical EPDM is Vistalon 4608 (Enjay Chemical Co.), a polymer having a Mooney viscosity at 212° F. of about 90, and having an ethylene content of about 56 wt. percent and a nonconjugated diene content of about 2.6 wt. percent, the remainder being propylene.

Styrene-butadiene rubber (SBR) is well-known to the art. Typically, these polymers contain about 5 to about 40 wt. percent styrene and have a Wijs Iodine No. of about 300 to 500 and a number average molecular weight of about 3,000 to about 600,000, preferably about 100,000 to about 150,000.

Polyisoprene (e.g., natural rubber, gutta-percha and balata and synthetics), polybutadiene (either cis-1,4, trans-1,4 or mixtures) and polychloroprene are polymers well-known in the art. They have number average molecular weights in the range of about 3,000 to 600,000, and preferably 100,000 to 350,000.

The study of plasticization of ionic interaction demands melt viscosity measurements under well-defined deformation conditions. A simple, convenient and informative method involves the use of a parallel plate plastometer. For a detailed discussion of the theory, calculations, etc., employed in the use of this instrument, see J. R. Van Wazer et al., *Viscosity and Flow Measurement*, Chap. 5, Interscience Publishers (1963). Basically, the material to be tested is placed between parallel circular plates and a constant force (symbolized by $f_r$) is applied perpendicularly to the plates to cause them to approach each other. The rheological behavior of the test material may be determined from a measurement of the displacement of one plate with respect to the other as a function of time. Through use of the parallel plate plastometer, one can determine the apparent viscosity of the melt vs. shear stress (or compressive force $f_r$) at low shear stress.

Another important method for analyzing processing characteristics of the preferentially plasticized ionomers is capillary rheometry (see Van Wazer et al., supra, Chap. 5). The technique involves the extrusion of material through a capillary with consequent determination of the shear stress to extrude at a constant shear rate. From such analyses the apparent viscosity at the shear rate in question can be determined. Shear rates commonly employed in such processing operations as compression molding, calendering, milling, Banbury mixing, tube extrusion, and injection molding can be covered conveniently by employing capillary rheometric methods.

The influence of polar plasticizers on the apparent melt viscosities of ionomeric and non-ionomeric compounds having the same backbone can be demonstrated by the data summarized in Table II. The ionomers used were sulfonated butyl rubbers having 0.4% and 0.6 mole percent sulfonation (as $SO_3Na$), respectively, and the non-ionomeric polymer used as the control was an unsulfonated butyl rubber having an identical backbone as the sufonated butyls. The viscosity average molecular weight of the butyl rubber was 575,000; the isobutylene content was 98.1%; the isoprene content was 1.9%, and the Mooney viscosity at 260° F. and 0.2 r.p.m. was 27. In all cases, the melt viscosities were measured at an effective load of 106 kg.

From these data it can be seen that, while the polar agents reduced the melt viscosity of the control only slightly (i.e., by an amount to be expected from the normal plasticization which would occur by introduction of agents having these carbon numbers), they very sharply reduced the melt viscosity of the ionomers. For the most part, the polar agents lowered the melt viscosity of the ionomers to nearly that of the control.

The melt viscosity values may be used to estimate the effective molecular weights of the system using well-known formulae for polyisobutylene. (See J. D. Ferry, *Viscoelastic Properties of Polymers*, J. Wiley & Sons (1961).) The results of the calculations are displayed in the lower portion of Table II. It is concluded that the polar plasticizers partially or completely relax the ionomeric bonds of the sulfonate domains and so reduce the effective molecular weight of the physically cross-linked network.

TABLE II.—EFFECT OF PLASTICIZERS ON THE MELT VISCOSITIES OF BUTYL AND SULFONATED BUTYL RUBBERS

| Plasticizer (5 phr.) | $\eta \times 10^6$ poises [a] | | |
|---|---|---|---|
| | Butyl 268 (0% $SO_3Na$) | Sulfonated butyl (0.6% $SO_3Na$) | Sulfonated butyl (0.4% $SO_3Na$) |
| None | 3.074 | 42.54 | 16.82 |
| DOTG-DCB [b] | 2.403 | 7.679 | 2.165 |
| Triethanolamine | 1.893 | 6.219 | 4.176 |
| Carbowax 200 | | | |
| HO[$C_2H_4O$]$_4$H | 2.209 | 1.594 | 3.716 |
| | Calculated effective $\overline{M}w$ | | |
| None | 571,000 | 1,070,000 | 795,000 |
| DOTG-DCB | 458,000 | 692,000 | 447,000 |
| Triethanolamine | 437,000 | 646,000 | 550,000 |
| Carbowax 200 | | | |
| HO[$C_2H_4O$]$_4$H | 447,000 | 437,000 | 513,000 |

[a] T=130° C., effective load=106 kg. on 1.75 sq. in. area platen.
[b] di-o-Tolyl guanidine salt of dicatechol borate.

In order to retain green (raw rubber) strength advantages for ionomers such as sulfonted butyl (i.e., long stress relaxation times at low temperatures), it is necessary to plasticize the ionic domains preferentially only at high temperatures. The following examples illustrate this plasticizing technique.

Example 1

A sulfonated butyl was prepared so as to contain 1.50 mole percent SO$_3$Na. The initial rubber contained 1.93 mole percent isoprene (the remainder being isobutylene) and had a viscosity average molecular weight of 550,000. The dry product was compounded in separate experiments with 3 phr. (parts per hundred of rubber) of zinc stearate (m p.=about 255° F.), calcium stearate (m.p.=about 356° F.), and zinc laurate (m.p.=about 210° F.). The unsulfonated butyl in similar compounds was included for control. The bulk Mooney viscosities were determined from 200° F. to 360° F., and the data are shown in Table III. It is apparent from the table that a dramatic drop occurs in the bulk viscosity of the sulfonated rubber at about the melt point of the polar agent. No such change in the bulk viscosity of compounds of the unsulfonated rubber was found (runs 5 to 8). It is thus shown that the ionic bonding can be virtually destroyed at elevated temperatures by polar agents which melt. The melt point of the ingredient can be used to control the viscosity-temperature transition. Such a transition was also found to occur in compounds of the sulfonated rubber and polar agent with carbon black and oil. The effect was found to be reversible in all cases so that, on cooling, the viscosity values were reproduced (see, for example, run 5 with the sulfonated rubber and run 10 with the unsulfonated rubber).

cool mill. Run 2 was prepared by mixing 100 g. of the sulfonated butyl with 20 phr. of CaSO$_4$:2H$_2$O on a cool mill. Run 3 was prepared by blending 100 g. of the sulfonated butyl with 40 phr. of calcium sulfate on a cool mill. The Mooney viscosity of the blended materials and the unblended sulfonated butyl rubber was determined at 260° F. and at 350° F. The data are shown in Table IV.

TABLE IV

| No. | Polymer | ML 5+8 min. 260° F., 0.2 r.p.m. | ML 30+8 min. 350° F., 0.2 r.p.m. |
|---|---|---|---|
| 1 | Sulfonated butyl | 66 | 40 |
| 2 | Sulfonated butyl plus 20 phr. of calcium sulfate. | 68 | 28 |
| 3 | Sulfonated butyl plus 40 phr. of calcium sulfate. | 75.2 | 28 |

Run Nos. 1, 2 and 3 were cooled to room temperature and retested at 260° F.

| | | | |
|---|---|---|---|
| 1 | | 63 | |
| 2 | | 79 | |
| 3 | | 88 | |

While the conventional sulfonated butyl Mooney viscosity was reduced from 66 to 40 in going from 260° F. to 350° F., the sulfonated butyls containing calcium sulfate were reduced respectively from 68 to 28 and from 75.2 to 28. On retesting at 260° F. after cooling the product, the Mooney viscosity was substantially the same as that prior to testing. Therefore, it is evident that calcium sulfate may be used in its hydrated form as a plasticizing agent for sulfonated butyl ionomers.

Any hydrated salt may be used in a similar manner as a plasticizer provided that the dissociation temperature

TABLE III.—PREFERENTIAL PLASTICIZATION OF IONIC BONDING BY POLAR AGENTS

| | Mooney (0.2 r.p.m.) | | | | | | | | | |
|---|---|---|---|---|---|---|---|---|---|---|
| | Sulfonated butyl (1.5% SO$_3$Na) | | | | | Butyl | | | | |
| Run number | 1 | 2 | 3 | 4 | 5 | 6 | 7 | 8 | 9 | 10 |
| T., °F. | 0 phr. agent | 3 phr. calcium stearate | 3 phr. zinc laurate | 3 phr. zinc stearate | Run 4 on cooling | 0 phr. agent | 3 phr. calcium stearate | 3 phr. zinc laurate | 3 phr. zinc stearate | Run 8 on cooling |
| 200 | 165 | 166 | 150 | 166 | 167 | 39 | 37 | 37 | 38 | 39 |
| 220 | 163 | 164 | 138 | 162 | 164 | 35 | 33 | 33 | 32 | 31 |
| 240 | 162 | 162 | 123 | 151 | 160 | 32 | 31 | 30 | 32 | 33 |
| 260 | 160 | 159 | 102 | 115 | 120 | 27 | 26 | 25 | 24 | 25 |
| 280 | 160 | 159 | 77 | 75 | 79 | 24 | 22 | 23 | 22 | 23 |
| 300 | 159 | 156 | 64 | 59 | 58 | 20 | 18 | 19 | 18 | 18 |
| 320 | 158 | 140 | 52 | 42 | 45 | 16 | 14 | 14 | 14 | 15 |
| 340 | 157 | 140 | 45 | 15 | 20 | 13 | 13 | 12 | 12 | 13 |
| 360 | 155 | 77 | 40 | 12 | 12 | 9 | 10 | 9 | 8 | 8 |
| M.P.—Ingredient, °F. | | 356 | 210 | 255 | 255 | | 356 | 210 | 255 | 255 |

Example 2

It has been found that the ionic interaction in the polymers can be substantially reduced using various plasticizing agents which release a small polar molecule such as water at an elevated temperature. Hydrated salts are examples of such agents which release water. In particular, CaSO$_4$:2H$_2$O is an ideal plasticizing agent in that at ordinary temperatures it does not act as a plasticizer but above 325° F. the calcium sulfate releases its two moles of water of hydration, thereby plasticizing the ionic groups of the sulfonated polymer.

A. A sulfonated butyl rubber was prepared by contacting 3 liters of butyl rubber cement containing 16.2 wt. percent solid with 27.2 ml. of a complex made by reacting 6.24 ml. of sulfur trioxide with 8.52 ml. of triethylphosphate in 135 ml. of methylene chloride. The reaction product was neutralized with 27.2 ml. of 0.2 normal NaOH in methyl alcohol.

B. The product produced in Part A (Run 1 of Table IV) of this Example was blended with CaSO$_4$:2H$_2$O on a of the salt is in the vicinity of the processing temperature of the polymer, i.e., about 200–450° F.

Example 3

Enjay Vistalon® 4608 ethylene-propylene-nonconjugated diene terpolymer rubber (an EPDM) which contained about 66.7 mole percent ethylene, 32.4 mole percent propylene, and 0.9 mole percent ethylidene norbornene was sulfonated in the manner disclosed in S.N. 877,849 to attain the following levels of sulfonation. Sample A (0.9 mole percent SO$_3$K); Sample B [0.8 mole percent (SO$_3$)$_2$Ca]. The samples were compounded on a rubber mill with preferential plasticizers whose melt points and concentration in the rubber are shown in Table V (Runs 1 to 3). In one case (Run 4) a volatile plasticizer was used. Slabs of the rubbers (Runs 1 to 3) about 0.045" thick were compression molded at 170° C. for 45 minutes under 24,000 p.s.i. In the case of the volatile plasticizer (Run 4) the slab was formed at 120° C. for 45 minutes under 15,000 p.s.i., a temperature which promoted evolution of the volatile plasticizer from the rubber. It was noticed that the rubber molded easily in the presence of the volatile plasticizer at the low temperature. After forming, the rubber slab of Run 4 was placed in a vacuum oven at about 50° C. for 16 hours. Subsequently, the slab of Run 4 was annealed for 45 minutes at 170° C. under 24,000 p.s.i. in a compression mold. This procedure was thought to insure removal of most of the residual volatile preferential plasticizer.

An additional sample (Run 5 of Table V) for comparison was prepared of chemically cured ethylene-propyleneterpolymer rubber using the sulfur vulcanization system and curing conditions noted in Table V.

Samples cut from the prepared slabs were stress relaxed for one hour at temperatures from 90° to 150° C. and for 16 hours at temperatures from 25° to 89° C. The stress relaxation procedures were conducted on an Instron tester at elongations from 40 to 50% of the initial sample 3 of Table VI for 0.9 mole percent $SO_3K$ and 0.8 mole percent $[SO_3]_2Ca$).

Run 4 of Table VI exemplifies the use of the volatile plasticizer. Once the sample has been formed and the volatile plasticizer has been evolved, the stress level in sulfonated EPDM is comparable to that of chemically cured EPDM (Run 5) across the temperature range of interest. It is evident from Table VI that use of the volatile plasticizer in ionomeric products would allow their fabrication by vented processing methods (extrusion, injection or compression molding) and that after evolution of the plasticizer, the ionic bonds set up in a configuration which is not easily destroyed thermally. In order to refabricate an article prepared from the sulfonated polymer by volatile plasticization, it would be necessary to either reintroduce a volatile plasticizer or to introduce a plasticizer with a preselected melt point.

TABLE V.—PREFERENTIAL PLASTICIZERS IN SULFONATED EPDM (VISTALON® 4608)
(Sample A has 0.9 mole percent $SO_3K$; Sample B has 0.8 mole percent $[SO_3]_2Ca$)

| Run No. | Sulfonated sample | Preferential plasticizer | Melt point, ° C. | Phr. preferential plasticizer |
| --- | --- | --- | --- | --- |
| 1 | A—0.9% $SO_3K$ | Stearoyl aminol phenol | 127 | 3 |
| 2 | A—0.9% $SO_3K$ | Calcium stearate | 156 | 3 |
| 3 | B—0.8% $[SO_3]_2Ca$ | Zinc stearate | 125 | 3 |
| 4 | B—0.8% $[SO_3]_2Ca$ | n-Butyl alcohol | a —90 | 15 |
| 5 | Cured EPDM (Polymer-100, ZnO-5, $S_8$-2, TMTDS-1), cured 30'/160° C. | | | | a Boiling point is 117° C.

length. Table VI shows the residual stress ($f$) of the various samples at the respective temperatures. Here, the stress is normalized by the initial cross-sectional area ($A_o$) and a strain ($\alpha$=final length/initial length) function, following methods frequently used in determining the elasticity of rubber. (See P. V. Tobolsky, "Properties and Structure of Polymers," J. Wiley & Sons, New York, 1962.)

Several important facts are revealed through examination of Table VI. Well below the melt point of the preferential plasticizers, sulfonated EPDM can display levels of stress or elasticity which are comparable to chemically cured EPDM (Runs 1 to 3 of Table VI as compared to Run 5). However, about 20° C. below the melt point of the preferential plasticizers the level of stress bearing capacity in sulfonated EPDM begins to decrease. At temperatures in the range of 20° C. above the plasticizer melt points, the stress level in sulfonated EPDM has been considerably reduced. By comparison, through this temperature range the level of stress in chemically cured EPDM remains at a high level.

The advantages of the present invention for using ionomeric materials as thermoplastic elastomers is evident from Table VI. Above the melt point of the preferential plasticizers where a low degree of ionic network structure prevails, the polymers can be processed and reprocessed. That is, at elevated temperatures the preferential plasticizers function to relax the ionic bonds. Below the melt point of the plasticizers, the ionomeric EPDM elastomers can exhibit strengths which are comparable to chemically cured EPDM rubbers. Under these conditions, the sulfonated EPDM can be used (i.e., in the form of a hose, weatherstripping, shoe sole, etc.).

Another observation from Table VI is the following: By increasing the melt point of the preferential plasticizer the stress will decay at a proportionately elevated temperature (compare Runs 1 and 2 of Table VI for Sample A [0.9 mole percent $SO_3K$]). Further, the fall-off of stress with temperature with similar plasticizer melt points depends somewhat on the counter ion (compare Runs 1 and TABLE VI.—STRESS RELAXATION OF IONOMERIC POLYMERS
(Run No. refers to Table V)

| | Stress=$[f/A_o][\alpha-^1/\alpha^2]$ lb./in.$^2$ | | | | |
| --- | --- | --- | --- | --- | --- |
| Run number | 1 | 2 | 3 | 4 | 5 |
| Temperature, ° C.: | | | | | |
| 25 | 113 | 116 | 120 | 117 | 118 |
| 60 | 135 | 130 | 137 | 125 | 122 |
| 90 | 115 | 125 | 120 | 133 | 129 |
| 120 | 57 | 100 | 81 | 118 | 135 |
| 150 | 12 | 60 | 41 | 116 | 107 |

Example 4

Enjay Vistalon® 3708 ethylene-propylene-diene-terpolymer rubber (an EPDM) which contained about 82.3 mole percent ethylene, 16.8 mole percent propylene, and 0.9 mole percent ethylidene norbornene was sulfonated to 0.9 mole percent $SO_3K$ in the manner of S.N. 877,849. This EPDM rubber was known to contain about 5% crystallinity was analyzed by X-ray diffraction. Diphenyl guanidine, with a melt point of about 150° C., was incorporated into the rubber at the 2 phr. (parts per hundred of rubber) level as the preferential plasticizer in a Banbury mixer at about 185° C. for 4 minutes. Also compounded into the rubber in the Banbury were carbon black and oil in the proportions listed in Table VII (Runs 1 to 3). Samples were prepared for stress relaxation in the manner of Example 3. The materials were stress relaxed for 16 hours at the indicated temperature between 25° and 89° C., and for 1 hour from 90° to 150° C. The results are shown in Table VIII. First, it is seen that the presence of a small degree of crystallinity in a sulfonated EPDM by virtue of a somewhat elevated ethylene content does not alter the preferential plasticization capacity of diphenyl guanidine for sulfonated EPDM. Run 1 of Table VIII displays a character similar to Runs 1 to 3 of Table VI. Furthermore, compounding the sulfonated EPDM with extremely high quantities of carbon black and oil does not alter the nature of preferential plasticization in this particular system. This is important for commercial applications where carbon black and oil are incorporated into rubber to reduce the overall compound cost as well as to provide some reinforcement.

Above the melt point of the preferential plasticizer samples of compounded and non-compounded EPDM and sulfonated EPDM (Table VII) were extruded from an Instron capillary rheometer (plunger diameter = 0.375", capillary diameter = 0.05", length/diameter of capillary

TABLE VIII.—STRESS RELAXATION OF SULFONATED EPDM COMPOUNDS

| | Stress*=$[f/Ao][\alpha/\alpha^{-1}/\alpha^2]$ lb./In.² | | |
|---|---|---|---|
| Run No.** | 1 | 2 | 3 |
| Compounding | None | 80 black/40 oil | 150 black/75 oil |
| Temperature, °C.: | | | |
| 25 | 95 | 96 | 97 |
| 60 | 95 | 92 | 90 |
| 90 | 90 | 85 | 84 |
| 120 | 40 | 39 | 37 |
| 150 | 20 | 22 | 10 |

*See discussion of Example 3.
**See Table VII.

TABLE IX.—EXTRUSION OF SULFONATED EPDM AND EPDM COMPOUNDS (185° C.)

| | Apparent viscosity (poise) | | | | | |
|---|---|---|---|---|---|---|
| | 1 | 4 | 2 | 5 | 3 | 6 |
| Run No. (Table VII) | | | | | | |
| Polymer | Sulfonated EPDM | EPDM | Sulfonated EPDM | EPDM | Sulfonated EPDM | EPDM |
| Compounding | None | | 80 black/40 oil | | 150 black/75 oil | |
| Extrusion rate* (seconds⁻¹) | | | | | | |
| 0.294 | 8.0×10⁶ | 4.5×10⁵ | 5.3×10⁶ | 4.9×10⁵ | 4.4×10⁶ | 2.0×10⁵ |
| 0.734 | 4.0×10⁶ | 3.0×10⁵ | 2.7×10⁶ | 3.3×10⁵ | 2.2×10⁶ | 1.0×10⁵ |
| 1.47 | 2.2×10⁶ | 2.7×10⁵ | 1.6×10⁶ | 2.1×10⁵ | 1.2×10⁶ | 7.0×10⁴ |
| 2.94 | 1.2×10⁶ | 1.9×10⁵ | 8.2×10⁵ | 1.4×10⁵ | 6.8×10⁵ | 4.4×10⁴ |
| 7.34 | 5.6×10⁵ | 1.3×10⁵ | 4.1×10⁵ | 7.8×10⁴ | 3.3×10⁵ | 3.0×10⁴ |
| 14.7 | 3.9×10⁵ | .0×10⁴ | 2.8×10⁵ | 5.5×10⁴ | 1.8×10⁵ | 2.1×10⁴ |
| 29.4 | 1.8×10⁵ | 5.7×10⁴ | 1.3×10⁵ | 4.0×10⁴ | 1.0×10⁵ | 1.6×10⁴ |
| 73.4 | 9.5×10⁴ | 3.7×10⁴ | 7.4×10⁴ | 2.1×10⁴ | 5.1×10⁴ | 1.1×10⁴ |
| 147 | 5.0×10⁴ | 2.7×10⁴ | 3.9×10⁴ | 1.3×10⁴ | 2.9×10⁴ | 8.0×10³ |

*For details of extrusion conditions see context of Example 4.

= 20). The temperature was 185° C. The apparent viscosity ($\eta_a$) was determined in Poise at the steady shear rate. The extrusion data are shown in Table IX. It appears from Table IX that, at high shear rates, the viscosity of the sulfonated EPDM stocks converge with those of the control; at low shear rates the viscosities of the sulfonated EPDM's are much higher than the controls. In the shear rate range common to such fabricating procedures as Banbury mixing, calendering, extrusion, and injection molding (10 to 1000 sec.⁻¹) the viscosities of the preferentially plasticized sulfonated EPDM compound are quite acceptable. The fact that the viscosities of sulfonated EPDM's are high at low shear rates and low at high shear rates may reflect a complex ionic bond breaking process in the presence of the preferential plasticizer. At high shear rates, presumably, the plasticizer enables the ionic cross-links to break and not to reform in a stressed configuration. At low shear rates, on the other hand, the results are interpreted to show that this particular plasticizer allows the bonds to reform in a stressed configuration within the time of deformation.

The advantage of the flow behavior exhibited by the sulfonated EPDM gums and compounds is that they would not undergo considerable flow when feeding (perhaps as pellets) to fabricating equipment (a low shear rate process); when high shear rates were introduced the materials would flow normally.

TABLE VII

Sulfonated EPDM (0.9 mole percent SO₃K, 2 phr. of diphenyl guanidine) and EPDM compounds (with 2 phr. of diphenyl guanidine)

| Run No. | Rubber | Compounding* |
|---|---|---|
| 1 | Sulfonated EPDM | None. |
| 2 | do | 80 phr. FEF black/40 phr. oil. |
| 3 | do | 150 phr. FEF black/75 phr. oil. |
| 4 | EPDM | None. |
| 5 | EPDM | 80 phr. FEF black/40 phr. oil. |
| 6 | EPDM | 150 phr. FEF black/75 phr. oil. |

*Oil is Humble Series—Flexon 846 (specific gravity at 60° F.=0.8649; Saybolt viscosity at 210° F.=43.4 sec.; aniline point=219° F.; silica gel aromatics=14.9% by weight).
FEF=Fine extrusion furnace carbon blacks.

Example 5

Cis 1-4 polybutadiene was dissolved in hexane at 2% by volume and centrifuged for 20 minutes to remove impurities. The rubber was found to have a number average molecular weight of about 110,000. The material in hexane was sulfonated in the manner disclosed by S.N. 877,849 to contain about 1.2 mole percent $(SO_3)_2Ca$. The polymer was dried and 15 phr. of n-butyl alcohol (volatile plasticizer) was added on the rubber mill. A slab of the sample was formed in the manner of Example 3 (Run 4). On inspection, the rubber appeared cured (by the ionic bonds) and was not remoldable at 300° F.

Example 6

Plasticizers were analyzed to determine the controlling molecular features of these materials which make them useful for relaxing ionic cross-linkages (i.e., to determine which plasticizers are preferential plasticizers within the context of this invention). Sulfonated butyl rubber (1.5 mole percent SO₃Na) of Example 1 and Sulfonated EPDM (0.9 mole percent SO₃K) of Example 3 were used. Plasticizers were incorporated at 3 phr. on the rubber mill and the samples were molded at 350° F. for 35 minutes under 24,000 p.s.i. pressure. The plasticizers had constituents of differing molecular bond moments [see, for example, Table I]. After molding the samples were examined visually to determine the extent of flow. The experimental results are shown in Table X. It was found that, if the plasticizer contained a unit whose absolute molecular bond moment was at least about 0.6 Debyes, good flow occurred. If the plasticizer contained a unit whose absolute maximum bond moment was less than about 0.6 Debyes, or if no plasticizer were present, very poor flow occurred. It was concluded that, in order for an agent to be useful as a preferential plasticizer for ionic cross-linkages, it must have a molecular constituent with a minimum bond moment of about 0.6 Debyes (absolute value).

TABLE X.—ANALYSIS OF PREFERENTIAL PLASTICIZER ACTIVITY

| Run No. | Material | Rubber* | Formula of material | Unit of max. bond moment | Absolute value of max. bond moment (Debyes) | Observed degree of flow |
|---|---|---|---|---|---|---|
| 1 | Hexadecane | S-B | $CH_3-(CH_2)_{14}-CH_3$ | C—H | 0.3 | Very poor. |
| 2 | Nonyl benzene | S-B | $CH_3-(CH_2)_8-\langle O \rangle$ | C—H | 0.3 | Do. |
| 3 | Tetrahydrofuran** | S-B | 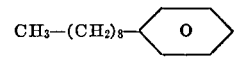 | C—O | 0.86 | Good. |
| 4 | n-Butanol** | S-E | $n-C_4H_9-OH$ | O—H | 1.53 | Excellent. |
| 5 | Chloroform** | S-B | $CHCl_3$ | C—Cl | 1.56 | Do. |
| 6 | Diphenyl guanidine | S-E |  | N—H | 1.31 | Do. |
| 7 | Stearic acid | S-B | $CH_3-(CH_2)_{16}-COOH$ | C=O | 2.4 | Do. |
| 8 | Zinc stearate | S-B | $Zn\left(O\overset{O}{\underset{\parallel}{C}}-[CH_2]_{16}-CH_3\right)_2$ | C=O | 2.4 | Do. |
| 9 | Suconox 18 | S-E |  | O—H | 1.53 | Do. |
| 10 | Di-n-octyl phthalate | S-B | 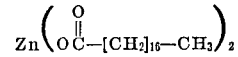 | C=O | 2.4 | Good. |
| 11 | Paracin 285 | S-E | $HO-(CH_2)_{17}-COO^- {}^+H_3N-CH_2)$<br>$HO-(CH_2)_{17}-COO^- {}^+H_3N-CH_2)$ | H⁺O | >3.6 | Excellent. |
|  | Tributyl phosphate | S-B | $n-(C_4H_9O)_3PO$ | P—O | 2.8 | Do. |
|  | None | S-B |  |  |  | Very poor. |
|  | None | S-E |  |  |  | Do. |

*Abbreviations: S-B is sulfonated butyl rubber, 1.5 mole percent SO₃Na; S-E is sulfonated EPDM rubber, 0.9 mole percent SO₃K.
**Volatile plasticizer.

Example 7

The sulfonated Vistalon® 3708 compounds of Example 4 (Runs 1 and 3 of Table VII) were tested for the effect of annealing on preferential plasticizer activity. The samples were pressed under 24,000 p.s.i. for 1 hour at 340° F. except where indicated in Table XI. Subsequently, the samples were cooled using four different annealing procedures. The aquilibrium stress at 150% elongation was determined for each sample by stress strain cycling to 300% strain. The effect of annealing on the physical properties for the gum and heavily loaded compound are shown in Table XI. It was found that annealing or slow cooling provides a small but definite enhancement to the degree of elasticity in the systems. For practical situations, however, annealing would not be required.

TABLE XI.—EFFECT OF ANNEALING ON PROPERTIES OF SULFONATED EPDM (1.05% SO₃K) AND A HEAVILY EXTENDED COMPOUND

| Annealing conditions: Press 1 hour at 340° F., then— | Properties: Equilib. retroactive force (lb./in.²) at 150% strain (determined through cycling) | |
|---|---|---|
|  | Gum (1.05% SO₃K) | Compound (150 phr. FEF, 75 oil) |
| Press 0.5 hours at 340° F.,* cool at 0.5° F./min. to 300° F., press 1 hour, cool to ambient at 0.5° F./min | 156 | 94 |
| Slow cool to ambient (0.5° F./minute) | 181 | 100 |
| Cool in air | 150 | 84 |
| Quench in liquid N₂ | 136 | 86 |

*Not pre-pressed at 340° F. for 1 hour.

While the above examples adequately illustrate the instant invention, they are not intended to limit the scope thereof to the specific examples disclosed. Many modifications and variations may be made without departing from the spirit of this invention. The invention is limited only by the claims which follow.

What is claimed is:

1. A composition of matter consisting essentially of an ionically cross-linked sulfonated elastomeric polymer in combination with a preferential plasticizer, said plasticizer being dispersible in but not completely molecularly soluble in said polymer, being liquid during processing of said polymer, having a melting point at least 25° above the contemplated use temperature of said polymer and not more than 50° below a preselected processing temperature for said polymer and having at least one functional constituent which exhibits a bond moment whose absolute value is at least 0.6 Debyes wherein said functional constituent may be independently selected from the group consisting of C—O, P—O, S—H, C—Cl, C—Br, C—F, C—I, S=O, and N—O; provided, however, where said preferential plasticizer is a volatile plasticizer said plasticizer is normally liquid at ambient temperatures and has a boiling point with an upper limit in the range of about 120° to about 190° C. and it is incorporated into the composition at about 0.25 to about 15 wt. percent based on the ionically cross-linked polymer and where the preferential plasticizer is a non-volatile plasticizer it is incorporated into the composition at about 0.5 to about 4 wt. percent based on the ionically cross-linked polymer.

2. A method for improving the processibility of an ionically cross-linked sulfonated elastomeric polymer which comprises dispersing in said polymer a preferential plasticizer, said plasticizer being liquid during processing of said polymer, having a melting point at least 25° above the contemplated use temperature of said polymer and not more than 50° below a preselected processing temperature for said polymer and having at least one functional constituent which exhibits a bond moment whose absolute value is at least 0.6 Debyes wherein said functional constituent may be independently selected from the group consisting of C=O, C—O, N—H, P—O, S—H, C—Cl, C—Br, C—F, C—I, S=O, and N—O; provided, however, where said preferential plasticizer is a volatile plasticizer said plasticizer is normally liquid at ambient temperatures and has a boiling point with an upper limit in the range of about 120° to about 190° C. and it is incorporated into the composition at about 0.25 to about 15 wt. percent based on the ionically cross-linked polymer and where the preferential plasticizer is a non-volatile plasticizer it is incorporated into the composition at about 0.5 to about 4 wt. percent based on the ionically cross-linked polymer.

3. A method for improving the processibility of an ionically cross-linked sulfonated elastomeric polymer which comprises the steps of:
  (a) dispersing in said polymer a volatile preferential plasticizer, said plasticizer being liquid during processing of said polymer, being dispersible in but not completely molecularly soluble in said polymer, having at least one functional constituent which exhibits a bond moment whose absolute value is at least 0.6 Debyes wherein said functional constituent may be independently selected from the group consisting of C=O, C—O, N—H, P—O, S—H, C—Cl, C—Br, C—F, C—I, S=O, and N—O and having a normal boiling point of from not more than 50° C. below to not more than 125° C. above a preselected processing temperature for said polymer, said plasticizer being incorporated into the composition at about 0.25 to about 15 wt. percent based on the ionically cross-linked polymer;
  (b) heating the polymer containing said plasticizer to the preselected processing temperature and processing thereat; and
  (c) evolving said volatile plasticizer from the processed polymer of step (b).

4. A method for improving the processibility of an ionically cross-linked sulfonated elastomeric polymer which comprises the steps of:
  (a) dispersing in said polymer a non-volatile preferential plasticizer, said plasticizer being liquid during processing of said polymer, said plasticizer being dispersible in but not completely molecularly soluble in said polymer, having at least one functional constituent which exhibits a bond moment whose absolute value is at least 0.6 Debyes wherein said functional constituent may be independently selected from the group consisting of C=O, C—O, N—H, P—O, S—H, C—Cl, C—Br, C—F, C—I, S=O, and N—O and having a melt point not more than 100° C. below a preselected processing temperature for said polymer, said plasticizer being incorporated into the composition at about 0.25 to about 15 wt. percent based on the ionically cross-linked polymer;
  (b) heating the polymer containing said plasticizer to the preselected processing temperature and processing thereat; and
  (c) cooling the processed polymer of step (b) sufficiently to cause said plasticizer to solidify.

5. The composition of claim 1 wherein said plasticizer has a melt point above the contemplated use temperature of the polymer and in the vicinity of a preselected processing temperature.

6. The composition of claim 1 wherein said plasticizer is a volatile plasticizer incorporated into the group at about 0.25 to about 6 wt. percent of said polymer.

7. The composition of claim 5 wherein the plasticizer has a melt point of at least 25° C. above the contemplated use temperature of the polymer.

8. The composition of claim 5 wherein said plasticizer is selected from the group consisting of the di-o-tolyl guanidine salt of dicatechol, diphenyl guanidine, and di-orthotolyl guanidine.

9. The composition of claim 1 wherein said plasticizer has a normal boiling point in the range of a preselected processing temperature.

10. The composition of claim 9 wherein said plasticizer has a boiling point in the range of not more than 30° C. below to 75° C. above the preselected processing temperature.

11. The composition of claim 9 wherein said plasticizer is selected from the group consisting of chloroform and tetrahydrofuran.

12. The composition of claim 1 wherein said polymer is an unsaturated, sulfonated elastomer.

13. The composition of claim 12 wherein said elastomer has an unsaturation in the range of about 0.6 to about 100 mole percent and is sulfonated in the range of about 0.4 to about 3.0 mole percent.

14. The composition of claim 13 wherein said elastomer is selected from the group consisting of the sulfonated derivatives of butyl rubber, ethylene propylene diene monomer, polybutadiene, polyisoprene, styrene-butadiene rubber, and polychloroprene.

References Cited

UNITED STATES PATENTS

| | | | |
|---|---|---|---|
| 2,416,060 | 2/1947 | McAlevy et al. | 260—23 |
| 2,669,550 | 2/1954 | Brown | 260—23.7 |
| 2,671,074 | 3/1954 | Brown | 260—80.7 |
| 3,404,134 | 1/1968 | Rees | 260—78.5 |
| 3,264,272 | 8/1966 | Rees | 260—78.5 |
| 3,322,734 | 5/1967 | Rees | 260—79.3 |
| 3,437,718 | 4/1969 | Rees | 260—889 |
| 3,471,460 | 10/1969 | Rees | 260—88.1 |
| 2,485,592 | 10/1949 | Griess et al. | 260—23 |
| 3,642,728 | 2/1972 | Canter | 260—79.3 |

FOREIGN PATENTS 1,154,338  6/1969  Great Britain.

DONALD E. CZAJA, Primary Examiner

E. C. RZUCIDLO, Assistant Examiner

U.S. Cl. X.R.

260—23 S, 30.4 R, 30.6 R, 30.8 R, 31.2 R, 31.4 R, 31.8 R, 32.4, 32.6 PQ, 32.8 A, 33.2 R, 33.4 PQ, 33.8 UA, 78.5 T, 79.3 R, Dig. 31

UNITED STATES PATENT OFFICE
CERTIFICATE OF CORRECTION

Patent No. 3,847,854          Dated November 12, 1974

Inventor(s) Nathan H. Canter and Donald J. Buckley

It is certified that error appears in the above-identified patent and that said Letters Patent are hereby corrected as shown below:

Column 17, line 46, cancel "15" and insert --4--.

Signed and Sealed this

Eleventh Day of January 1977

[SEAL]

Attest:

RUTH C. MASON
Attesting Officer

C. MARSHALL DANN
Commissioner of Patents and Trademarks